INVENTORS
Ramon L. Alonso
Robert E. Oleksiak
William B. Turner
BY Joseph J. Alekshun, Jr.
ATTORNEY

PROCESS FOR MANUFACTURING DIGITAL COMPUTER MEMORIES

INVENTORS
Ramon L. Alonso
Robert E. Oleksiak
William B. Turner
BY Joseph J. Alekshun, Jr.
ATTORNEY INVENTORS:
Ramon L. Alonso
Robert E. Oleksiak
William B. Turner
BY Joseph J. Alekshun, Jr.
ATTORNEY INVENTORS
Ramon L. Alonso
Robert E. Oleksiak
William B. Turner
BY Joseph J. Alekshun, Jr.
ATTORNEY United States Patent Office 3,451,129
Patented June 24, 1969

3,451,129
PROCESS FOR MANUFACTURING DIGITAL COMPUTER MEMORIES

Ramon L. Alonso, Cambridge, Robert E. Oleksiak, Bedford, and William B. Turner, Lexington, Mass., assignors to Massachusetts Institute of Technology, Cambridge, Mass., a corporation of Massachusetts Filed Jan. 5, 1966, Ser. No. 518,951
Int. Cl. H01f *7/06;* H01s *5/00;* H01r
U.S. Cl. 29—604 10 Claims

ABSTRACT OF THE DISCLOSURE

Process of manufacturing a braid-like harness of conductive address wires for use in a wired-in digital computer memory of the type generally referred to as a "braid memory." A variant Jacquard loom is employed for segregating a single bunch of address wires into two groups corresponding to two different logic states, Ones and Zeros, according to a desired logical pattern. A temporary separator is inserted between the two wire groups to maintain their separation. The groups are then recombined by operation of the loom mechanism into a single bunch. A single braid-like loop is thus completed. The aforementioned manipulative steps are repeated until the desired number of braids in the harness is achieved.

The invention described herein was made in the performance of work under a National Aeronautics and Space Administration contract and is subject to the provisions of Section 305 of the National Aeronautics and Space Act of 1958 Public Law 85–568 (72 Stat. 435; 42 U.S.C. 4257).

This invention relates generally to the manufacture of digital computer memories, and particularly resides in a new use for a Jacquard loom in a process for manufacturing wired-in computer memories.

Wired-in memories are used in digital computers. The principal features of such memories, with special emphasis on the popular core rope variety, are summarized by Hayden A. Nelson in an article entitled "A Wired Core Memory for Airborne Computers," appearing in the December 1964 issue of Solid State Design. The salient features of another popular wired-in memory, the so-called "Dimond Ring," are described by D. M. Taub in an article entitled "A Short Review of Read-Only Memories," which appears in Proceedings I.E.E., vol. 110, No. 1, January 1963. A review of the literature indicates that wired-in memories are used in data processing systems and computers of the type requiring a simple and highly reliable means of permanent storage at high bit densities. Examples of such use include code translators for telephone systems, computer sub-routines, data tables and the like.

The high reliability of the wired-in memory is directly attributable to its being characteristically fixed in that data are stored according to the geometry of the wiring configuration. For example, in the illustration of the Dimond Ring memory of FIG. 1, there is one address wire 10 for each word stored, and one toroidal transformer core 12 for each bit in the word. Ordinarily, each address wire threads through or bypasses a particular core depending on whether the corresponding bit to be stored permanently is, respectively, a logical ONE or ZERO. The number of address wires employed is limited by the aperture size of the core. Read-out is effected by pulsing a particular address wire with an electrical signal, and detecting the responding voltage of each sense winding 14. Although the Dimond Ring of FIG. 1 embodies one of the many available wired-in memories, it is illustrative of how a logic pattern or word can be constructed by threading or bypassing the respective magnetic cores.

A serious drawback to the construction of wired-in memories is that each address wire must be individually manipulated through or about each core. Originally this was done manually. More recently, machines have been devised to expedite the function. Even with machine aid, however, construction is tedious and quite time-consuming.

Because of the time-consuming process of manufacturing dense (or multi-bit) wired cores, new and improved cores and wiring techniques have been devised for providing functionally equivalent memories that lend to more efficient manufacture. FIG. 2 illustrates one of the more recent designs, called the braid memory, which comprises a braided harness 20 of address wires mounted on U-shaped cores 22 made of linear transformer material and having removable crosspieces 24, each core wrapped with a sense winding 26 in the conventional manner. Although technically the harness is not truly braided, it is described as such because of its general appearance.

As illustrated in FIG. 2, harness 20 consists of two parallel groups of address wires with crossovers 20A occurring at equal intervals so as to form a ladder-like configuration of interconnected loops, called braids, which are secured by lacing 21. The memory is assembled simply by laying the harness on the serially arranged U-shaped cores and replacing the crosspieces to close the magnetic path. The harness is mounted so that one of the parallel groups passes through the inside of the cores, forming an inner channel 20B, and the other group bypasses the cores, forming an outer channel 20C. The logic pattern of each address wire is determined by whether it resides in the inner or outer channel at each core position. The transfer of address wires from one channel to the other, according to a predetermined pattern, is effected via the crossovers.

For example, assume that the first three bits of a word to be stored by a given address wire represent a logical ONE, ZERO, ONE, respectively. Also assume the customary convention that a threaded core represents a logical ONE while a bypassed core represents a logical ZERO. The address wire will reside in the inner channel of the harness as it passes through the first core; the wire will then physically cross from inner to outer channel via crossover 20A and remain in the outer channel so as to bypass the second core; finally, it will physically cross back to the inner channel via the next crossover so as to thread the third core. A bunching of the crossover wires gives the harness its ladder-like appearance.

Primary advantages of the braid memory as opposed to other wired-in configurations are that individual core threading is no longer necessary and fabrication is relatively straight-forward once the braided harness is complete. However, it can be appreciated that in the manufacture of high density memories the managing of those wires to thread and those to bypass each core, according to the predetermined logic plan, is extremely difficult and can eventually lead to severe entanglements. A convenient means of segregating the address wires that fall in each group or channel for each core is needed in order for the braid memory to offer a significant reduction in manufacturing time, and hence cost, over other wired-in memories employing toroidal cores and conventional threading techniques.

In view of the foregoing limitations in the manufacture of computer memories, it is a general object of the invention to provide a simple, fast, and relatively inexpensive process for manufacturing wired-in computer memories.

It is another object of the invention to provide a versatile process for forming a braided harness of address wires for wired-in braid memories.

It is another object of the invention to provide a convenient technique for separating a single bunch of address wires into two logic groups.

It is another object of the invention to provide a process for controlling the sequential logic disposition of each of the several address wires in the manufacture of wire harnesses for braid memory units.

It is a further object of the invention to provide a process whereby the logic disposition of each address wire may be automatically programmed.

These and other objects are met by a process employing a variant Jacquard loom for manipulating the logic disposition of the respective address wires intended for the computer memory. Each wire is coupled to a heddle in the loom and is thereafter manipulated by the mechanical action of the heddle drive mechanism in the same manner that threads of fabric are controlled in the conventional weaving operation. In accordance with the process, a single bunch of address wires is segregated into two groups by the action of the heddle drive mechanism. Those wires designated by the layout plan for the logic ONE channel of a corresponding transformer core are collected together into one group, and similarly, those designated for logic ZERO are collected into another group. A temporary separator is inserted in the opening between the two groups to maintain their separation. The groups are then recombined by operation of the heddle drive mechanism into a single bunch and a single braid is completed. The individual wires of the reformed address bunch are subsequently separated and collected into the particular logic ZERO and logic ONE groups for the succeeding core by similar action of the heddle drive mechanism. Once again, a temporary separator is inserted to maintain the separation and the wires are recombined to complete a braid. The preceding steps of collecting the wires into two groups, maintaining their separation, and recombining them again into a single bunch continues, and upon the completion of each sequence of steps another braid of the harness takes form. Upon completion of the construction, the braids are permanently secured, and the temporary separators removed. The harness is then ready to be laid on a series of open cores in the final construction of the computer memory.

Further objects, features, and advantages of the present invention and a better understanding thereof will become apparent from the following detailed description taken in conjunction with the accompanying drawings, of which, FIG. 1 illustrates a Dimond Ring type of wired-in computer memory having toroidal cores to which reference has already been made;

The Jacquard loom is a well known mechanical apparatus employed in the textile industry for weaving fabrics. It is a descendent of the basic machine invented by Joseph Marie Jacquard in the early nineteenth century. The standard Jacquard loom together with the many improvements and innovations are adequately described by T. W. Fox in a book entitled The Mechanism of Weaving, Macmillan Company, London, 1922. Consequently, the machine is not now described except insofar as it is varied simply to facilitate the manufacture of harnesses for wired-in computer memories in accordance with the present invention. As is described below in more detail, these variations comprise the substitution of electromechanical units for certain mechanical components in the heddle drive mechanism of the standard loom, and the incorporation of a tape in lieu of a series of Jacquard punch-cards to carry the logic program.

The basic function of the Jacquard loom in the manufacture of textiles is to separate selected ones of longitudinally arranged fibers (the warp) into two groupings in order to provide an opening (a shed) through which transverse fibers (the weft) may be passed. The continuous fabric is manufactured by the repeated steps of forming the shed, passing the weft through the shed, and driving each weft fiber into its proper position in the fabric. These steps may be respectively termed shedding, picking, and beating up. The variant loom employed in the present process simply performs an operation analogous to shedding.

Figures 3, 3A:
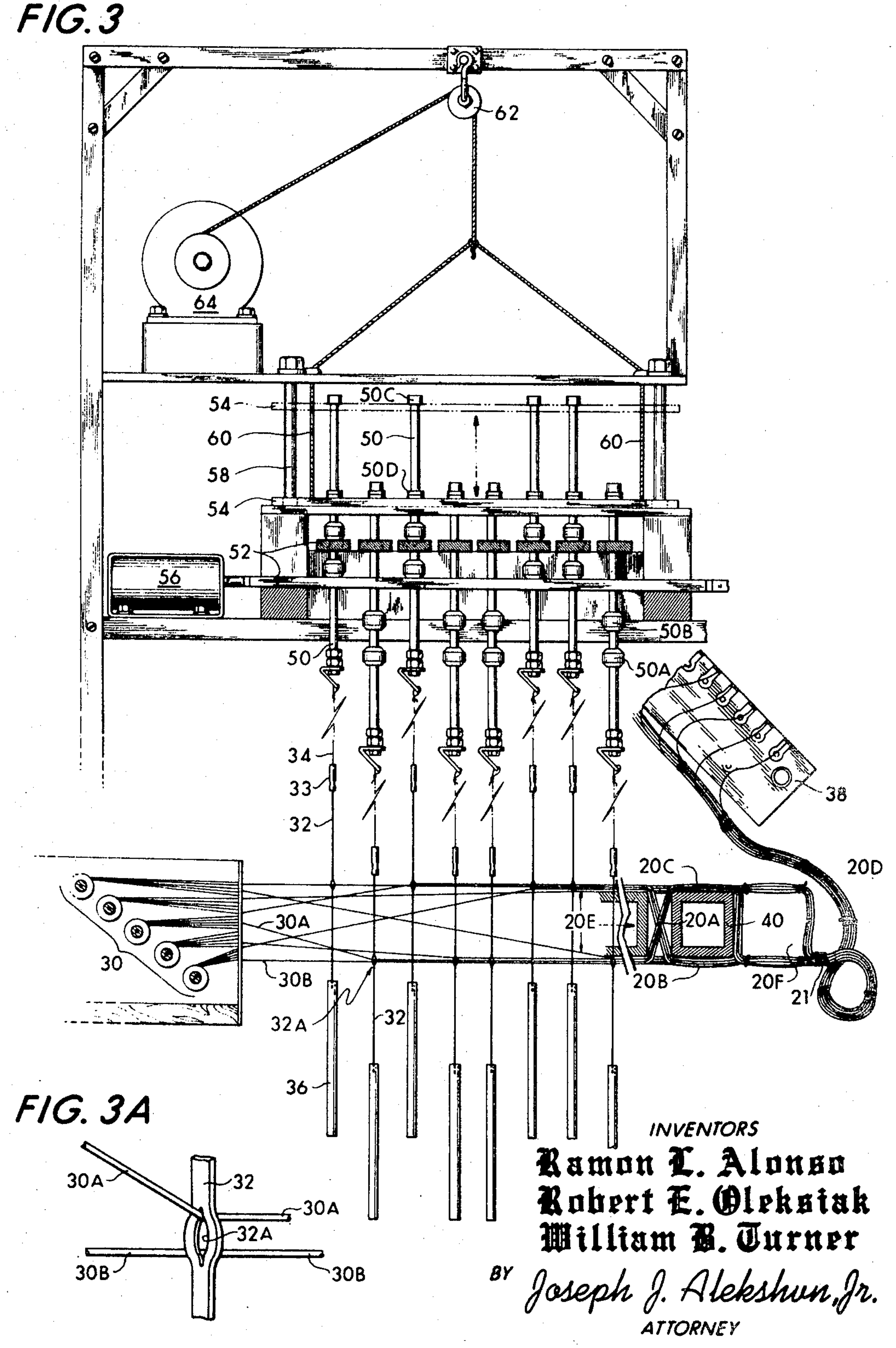
FIG. 3 illustrates the heddles in a variant Jacquard loom and their coaction with the respective address wires in the formation of braids for the wire harness of a computer memory.
FIG. 3A is an expanded view illustrating how one address wire threads one heddle only.

More specifically, as illustrated in FIG. 3, longitudinally arranged address wires are fed from spools 30 through eyelets 32*a* in heddles 32, much the same as longitudinal fibers are arranged in textile manufacture. To permit individual control, only one wire passes through each heddle as more clearly illustrated in FIG. 3A. The heddles are suspended along the vertical from couplings 34 and are stabilized by lingoes 36. The knot joining a heddle to its coupling is encased in a heat shrunk plastic cover 33 to prevent it from catching with the knots of adjoining heddles. Couplings 34, in turn, connect to metal heddle rods 50 which are regulated by a tape actuated heddle drive mechanism to be described below. All heddles can be set in either of two positions Up or Down.

Initially, all of the heddles are set in the Up position, thereby forming a single bunch 20D of address wires. Each wire in the bunch is terminated at one terminal post of terminal board 38. Where the bunch is composed of a number of wires some aid may be useful in withdrawing wires to facilitate their connection to the terminals of board 38. For the machine of FIG. 3, the heddle drive mechanism is programmed to perform that function. The initial program on the tape activates the heddle drive mechanism to release selected groups of heddles from the Up position. As the released heddles assume a Down position, the corresponding wires separate from the bunch, are grasped, and connected to their assigned terminal posts on board 38. After the entire termination procedure is completed, the tape couples a "Clear" command to the heddle drive mechanism. This command initiates the Clear operation, to be described later, which resets all heddles to their Up position. The tape then proceeds into the program defining the sequential logic disposition for each of the several address wires.

Figure 3B:
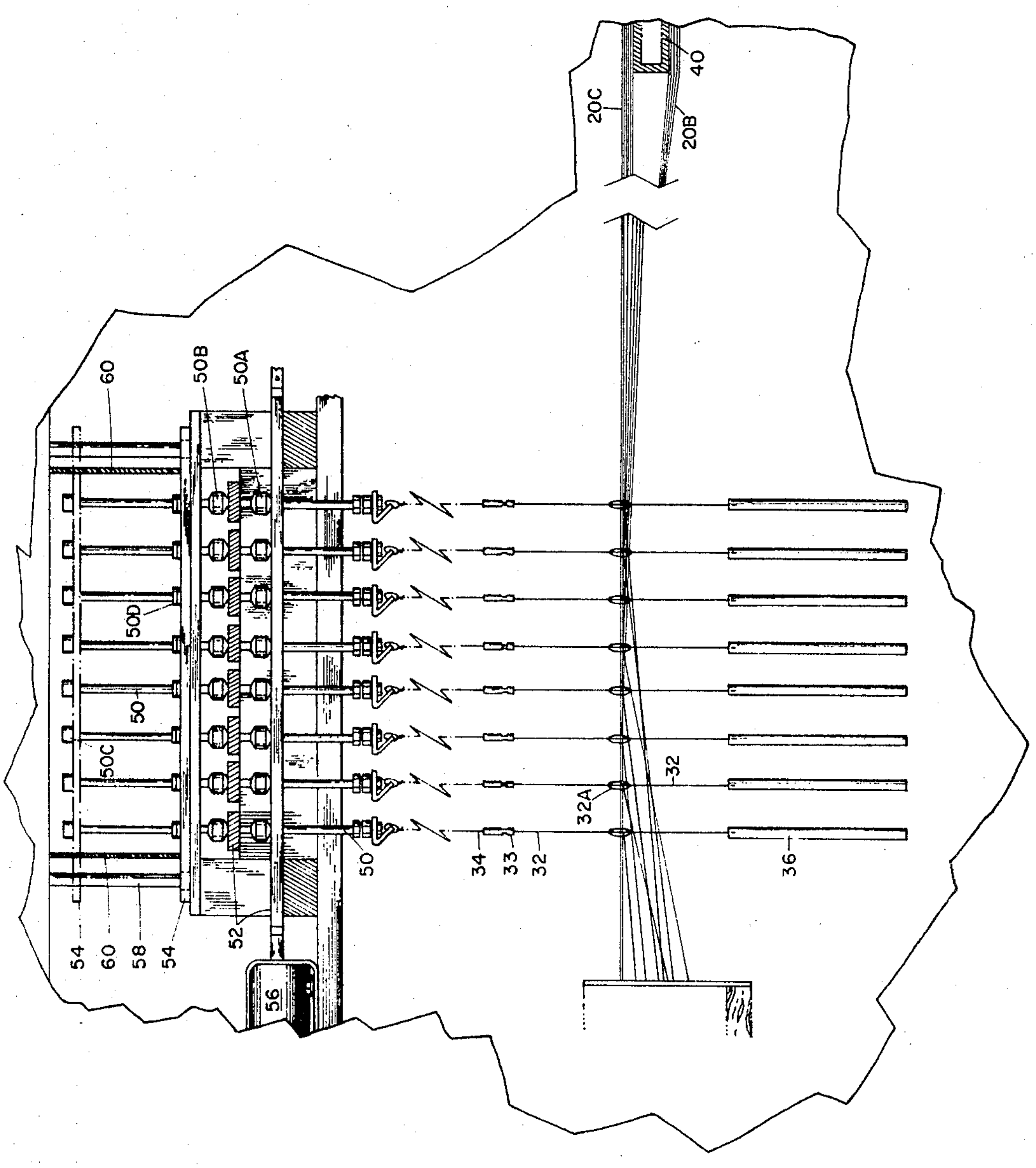
FIG. 3B illustrates the heddles and address wires of FIG. 3 with all of the heddles in the Up Position.

The taped program contains a sequence of instructions for dividing the address wires into logic ONE and ZERO groups according to the planned logic pattern to be constructed into the harness. Each instruction is succeeded by a Clear command that recombines the address wires into a single bunch. As illustrated in FIG. 3, the heddle drive mechanism responds to each instruction by lowering to the Down position only those heddles carrying logic ONE address wires. Consistent with the convention established earlier in the introduction of the specification, logic ONE wires are those that will pass through the inside of the magnetic core (occupy the inner wire channel of the corresponding core) when the memory is finally constructed. As further illustrated in FIG. 3 the division into logic ONE and logic ZERO groupings 20B and 20C, respectively, creates a shed 20E. The shed is maintained by the insertion of temporary separator 40. Wire groupings 20B and 20C are then reformed into a single bunch by the Clear operation which returns all of heddles 32 to their Up position as illustrated in FIG. 3B. The re-formation of the wires into a single bunch initiated by each intervening Clear operation, to be later described, followed by the redistribution of the wires into two groups, develops crossovers 20A in the wires. The braid-like or square configuration of the shed is formed by the action of separator 40 being pressed against crossover 20A.

Each instruction in the program has a distinct order for manipulating a single heddle in the machine, and for storing the desired binary word in the associated address wire. The following example illustrates the orders and manipulations required for the *n*th address wire storing a word beginning with the bits ONE, ZERO, ONE. Like all other heddles, the initial condition of the *n*th heddle is Up. The heddle drive mechanism responding to an order in the first taped instruction releases the *n*th heddle to the Down position and the *n*th wire is lowered with all other wires having a first bit of ONE. A temporary separator is inserted in the formed shed. Subsequently, the *n*th heddle is returned to the Up position by the drive mechanism acting upon a Clear comand signal succeeding the first taped instruction. The *n*th heddle remains Up for the second manipulation of the address wires and while a separator 40 is inserted in the second formed shed. It is subsequently cleared along with all other heddles. The order in the third instruction is for a logic ONE, and accordingly the heddle drive mechanism lowers the *n*th heddle to the Down position, and the *n*th wire is grouped with all other address wires having a third stored bit of ONE. The *n*th heddle is then raised by the Clear operation and is then ready for an order in the fourth instruction. The manipulation of the *n*th wire is representative of all address wires in the bunch.

Figure 1:
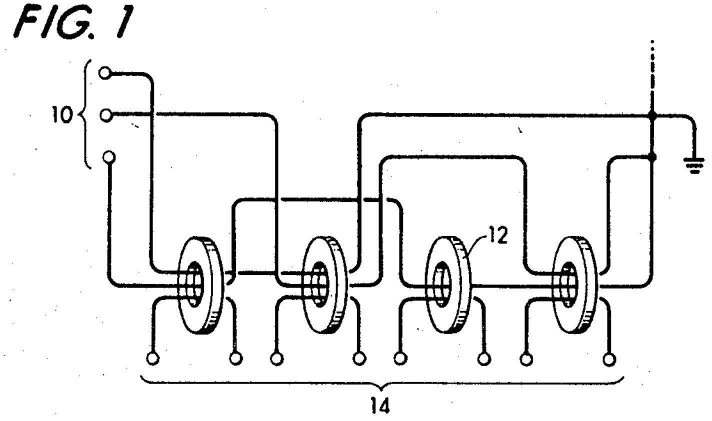
Figure 2:
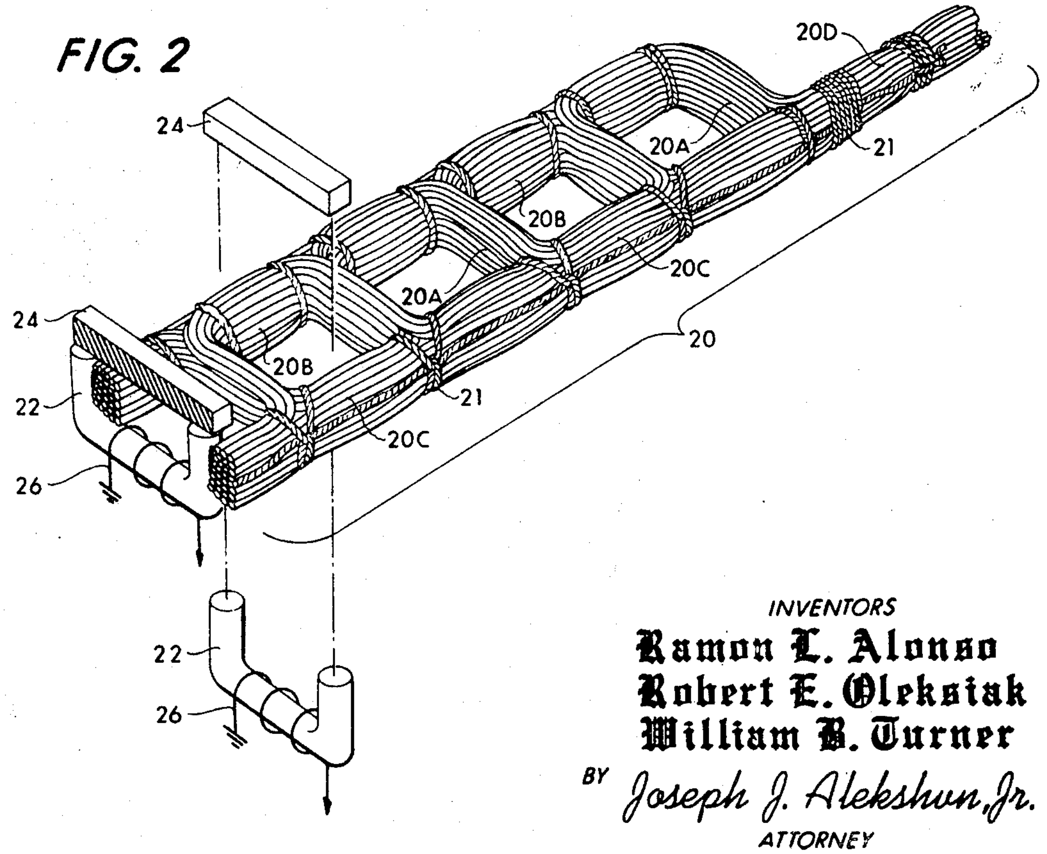
FIG. 2 illustrates the previously referenced braid type wired-in computer memory with a ladder-like harness of address wires and U-shaped transformer cores having removable crosspieces.

The preceding steps of forming sheds, inserting separators to maintain the sheds, and recombining the several address wires into a single bunch continues and a series of braids develops in the wires. When the last braid is completed, each of the wires is connected to its assigned post on a second terminal board and the harness is removed from the machine. The separators are removed, and the series of braids is secured either by lacing 21 or by the application of potting compound. A completed braid is shown as 20F in FIG. 3. The finished harness resembles the one previously shown in FIG. 2.

As is evident, the sole role performed by the machine of FIG. 3 is to separate the respective address wires so those having the same binary designation may be grouped according to their assignment to the inner or outer channels of each core. The division of individual wires into two groups to form a shed is a basic capability of a standard card actuated Jacquard loom. Consequently, a Jacquard loom may be used to implement the above process. The variant loom shown in FIG. 3 offers an alternative. That machine adopts the Jacquard principle of having one heddle in correspondence with each address wire; however, it uses electro-mechanical units rather than pure mechanical assemblages in the heddle drive mechanism, and is tape rather than card actuated. The features of the variant heddle drive mechanism are illustrated in FIG. 4 taken in conjunction with FIG. 3.

Figure 4:
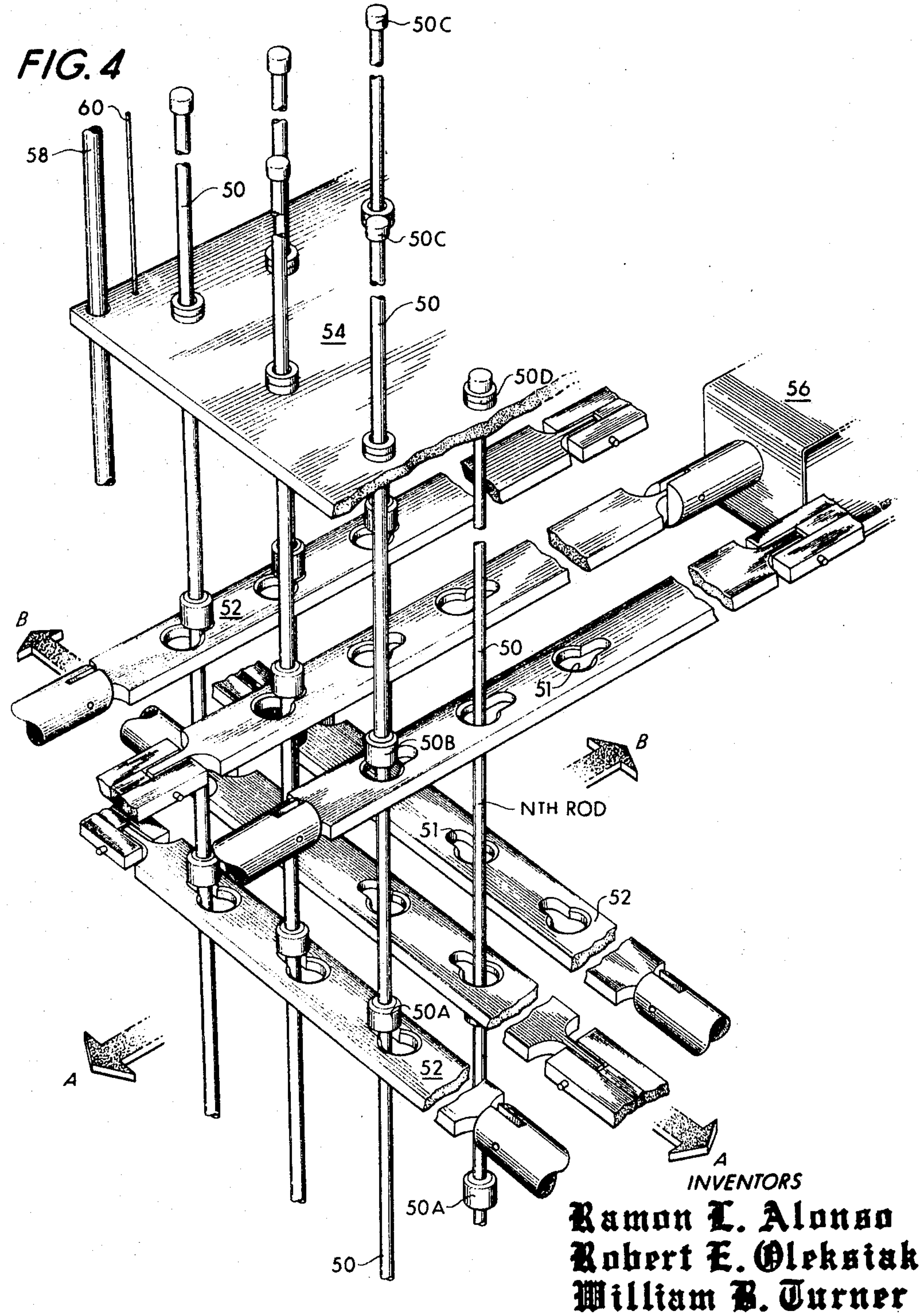
FIG. 4 illustrates the features of the heddle drive mechanism of the variant Jacquard loom of FIG. 3.

As more clearly illustrated in FIG. 4, the heddle drive mechanism comprises a matrix of solenoid actuated cross-bars and a combination of heddle rods. In particular, rods 50 that couple directly to the heddles extend upward through notched holes 51 in a two-layer array of orthogonal cross-bars 52, and continue upward through perforations in a movable metal plate 54 positioned directly above the cross-bar array. Each heddle rod 50 has three bushings 50A, 50B, and 50C. The notches and bushings are beveled to facilitate their interaction. When the rods are in the up position, bushings 50A are aligned with the notched holes in the bottom layer of cross-bars, bushings 50B are aligned with the notched holes in the top layer of cross-bars, and bushings 50C are some distance above the face of the plate. When the rods are in the Down position, bushings 50A and 50B are below the cross-bar array and bushings 50C rest against washers 50D on the face of the plate, as indicated by the arrangement of the *n*th rod. Each cross-bar in each layer is translated lengthwise by the joint action of a pair of solenoids 56, one located at each end of the bar.

Heddle rods are locked in the Up position upon translation of one or both layers of cross-bars in direction A, which translation causes the notches in the cross-bars to obstruct the downward passage of bushings 50A and 50B. Heddle rods are released when bushings 50A and 50B are made to oppose the wider diameter holes by translation of the cross-bars in direction B. Release of each rod is contingent on the coincidence of the wide-diameter holes in both of its related cross-bars. This, of course, requires that coincident signals activate the corresponding solenoids to drive those bars in direction B. Once totally released, the rods move into a Down position.

Referring to FIG. 3, rods in the Down position are returned to the Up position by the action of plate 54 which is raised along guide 58 by a four-wire motor-driven pulley 62 positioned on the top of the heddle drive mechanism. Only two corner wires 60 of the pulley are illustrated. Solenoids 56 and pulley motor 64 are tape actuated. The tape unit itself is not shown.

Manipulation of the heddle drive mechanism of FIG. 4 is as follows. Heddles are reset by a Clear operation which leaves all heddles in the Up position. This operation is initiated by a Clear command from the tape unit consisting of a command to all solenoids to drive in direction B. Rods left in the Up position by an earlier operation are released and join those rods already in the Down position. Thereafter the motor pulley receives a command to pull plate 54 upwards. When all heddle rods are pulled to the Up position, a final command is transmitted to all solenoids to drive in the A direction. Rod motion in direction A leaves bushings 50A and 50B of all heddle rods aligned with their notches and thus locked in the Up position. Plate 54 is then lowered along guide 58. The heddle control mechanism is now prepared to receive instructions from the tape unit for the disposition of address wires.

Accordingly, solenoids in correspondence with the heddle rods of those wires designated for disposition as logic ONES receive instructions from the tape unit to drive their cross-bars in direction B. Appropriate rods such as the *n*th rod of FIG. 4 are released and carry their wires to a Down position, and a shed is formed between the address wires of heddle rods positioned Up and rods positioned Down. After the shed is maintained by a temporary separator in accordance with the procedures described earlier in the specification, the heddle drive mechanism is ready to be again cleared.

The tape actuating unit though not shown in FIGS. 3 and 4 comprises a conventional tape reader, such as one manufactured by Friden Incorporated of Boston, Mass., in combination with standard logic circuits for achieving correspondence between the taped instructions and commercially available solenoids, such as those manufactured by Guardian Electric Manufacturing Company of Chicago, Ill. Obviously, power amplifiers are necessary to increase signals emitted by the reader to a level adequate for energizing the solenoids. Magnetic or punched tapes may carry the instructions. The design of the tape actuating unit as well as associated equipment and logic circuitry is considered well within existing digital techniques and is consequently not here described.

Although a substantially automated process has been described, it is apparent that various modifications may be made therein and yet remain within the intended scope of the invention. For instance, it may prove advantageous to give the operator more control over the rate of manufacture of the harnesses rather than have it programmed in fixed time. In such event, the tape could be advanced one instruction at a time by the operator and the Clear operation, which resets heddles following each instruction, could be initiated by manual switching. One switch could energize the solenoids to release all heddle rods and another switch activate the pulley motor to raise and lower the plate as previously described. To cover the above and other departures that may be made and yet remain within the true spirit and scope of the invention, the invention is now defined in the appended claims.

What is claimed is:

1. A process for constructing binary bits into the plurality of wires of a wire harness for a computer memory, wherein each of said wires has a first and a second end, said wires being secured at both of said ends, said process using a machine having elements that may be individually displaced from a starting first position to a second position by a drive mechanism and wherein each of said elements is coupled to one of said wires, said process comprising a series of steps, each of said steps including, (a) first, displacing certain of said elements from said starting first position to said second position thereby separating said wires into two groups, (b) second, inserting a separator between said two wire groups thereby maintaining the separation between said two wire groups, and (c) third, returning said certain of said elements to said starting first position thereby recombining said wires into a single bunch.

2. A process as defined in claim 1 wherein said drive mechanism is actuated according to a program for constructing logic ONES and ZEROS into said wire harness and one of said two wire groups corresponds to the logic ONE wires to be constructed into said harness.

3. A process as set forth in claim 1 wherein the number of steps in said series equals the number of cores in said computer memory.

4. A process as described in claim 1 wherein the *n*th of said address wires is coupled to the *n*th of said elements and the *n*th element is placed in said starting first position when said *n*th wire is to have a binary ZERO and placed in said second position when said *n*th wire is to have a binary ONE.

5. A process as described in claim 1 wherein the *n*th of said address wires is coupled to the *n*th of said elements and the *n*th element is placed in said starting first position when said *n*th wire is to have a binary ONE and placed in said second position when said *n*th wire is to have a binary ZERO.

6. A process as defined in claim 1 wherein said machine constitutes a Jacquard type loom and said elements the heddles of said loom.

7. A process for constructing binary bits into the plurality of wires of a wire harness for a computer memory, wherein each of said wires has a first end and a second end, said wires being secured at both of said ends, said process using a machine having elements that may be individually manipulated between two positions by a drive mechanism and wherein each of said elements is coupled to one of said wires, said process comprising a series of steps, each of said steps including, (a) first, placing certain of said elements in one of said two positions and the remainder of said elements in the other of said two positions, thereby separating said wires into two groups;

(b) second, inserting a separator between said two wire groups thereby maintaining the separation between said two wire groups; and (c) third, placing all of said elements in one of said two positions, thereby combining said wires into a single bunch.

8. A process as defined in claim 7 wherein said drive mechanism is actuated according to a program for constructing logic ONES and ZEROS into said wire harness and one of said two wire groups corresponds to the logic ONE wires to be constructed into said harness.

9. A process as set forth in claim 7 wherein the number of steps in said series equals the number of cores in said computer memory to be applied to said harness.

10. A process as defined in claim 7 wherein said machine constitutes a Jacquard-type loom and said elements are the heddles of said loom.

References Cited

UNITED STATES PATENTS

| | | | |
|---|---|---|---|
| 3,174,214 | 3/1965 | Davis | 29—604 X |
| 3,258,039 | 6/1966 | Ewalt | 29—203 X |
| 3,259,968 | 7/1966 | Dyksterhouse | 29—203 X |
| 3,310,867 | 3/1967 | Ehrat et al. | 29—203 X |
| 3,340,403 | 9/1967 | Wetmore | 340—174 X |
| 1,828,336 | 10/1931 | Morton | 139—59 X |
| 1,945,997 | 2/1934 | Rossmann | 139—59 X |
| 3,100,510 | 8/1963 | Janney | 139—59 X |

JOHN F. CAMPBELL, *Primary Examiner.*

D. C. REILEY, *Assistant Examiner.*

U.S. Cl. X.R.

29—203; 139—12, 59; 340—174